US009348846B2

(12) United States Patent
Krishnan et al.

(10) Patent No.: US 9,348,846 B2
(45) Date of Patent: May 24, 2016

(54) USER-NAVIGABLE RESOURCE REPRESENTATIONS

(75) Inventors: Raj Krishnan, New York, NY (US); Ryan Kelly, Princeton, NJ (US); Daniel Rocha, New York, NY (US); Harvey C. Jones, Brooklyn, NY (US); Jeremy Silber, New York, NY (US); Hannah Allison Johnston, Sunnyside, NY (US); Russell Yanofsky, New York, NY (US); Yegnaswamy Ramakrishnan Sermadevi, New York, NY (US); Alexander Fischer, New York, NY (US)

(73) Assignee: Google Inc., Mountain View, CA (US)

(*) Notice: Subject to any disclaimer, the term of this patent is extended or adjusted under 35 U.S.C. 154(b) by 208 days.

(21) Appl. No.: 13/540,414

(22) Filed: Jul. 2, 2012

(65) Prior Publication Data

US 2015/0169145 A1    Jun. 18, 2015

(51) Int. Cl.
*G06F 17/30* (2006.01)
*G06F 17/22* (2006.01)

(52) U.S. Cl.
CPC .... *G06F 17/30277* (2013.01); *G06F 17/30864* (2013.01); *G06F 17/30991* (2013.01)

(58) Field of Classification Search
CPC .......... G06F 17/2235; G06F 17/30864; G06F 17/30277; G06F 17/30991
USPC .................................................. 715/206, 738
See application file for complete search history.

(56) References Cited

U.S. PATENT DOCUMENTS

| | | | |
|---|---|---|---|
| 5,745,716 A * | 4/1998 | Tchao et al. | 715/777 |
| 6,463,428 B1 | 10/2002 | Lee et al. | |
| 6,484,190 B1 | 11/2002 | Cordes et al. | |
| 6,499,029 B1 | 12/2002 | Kirapati et al. | |
| 6,567,800 B1 * | 5/2003 | Barrera et al. | |
| 6,665,687 B1 | 12/2003 | Burke | |
| 6,785,671 B1 * | 8/2004 | Bailey et al. | 705/26.81 |
| 6,925,608 B1 | 8/2005 | Neale et al. | |
| 7,017,123 B2 | 3/2006 | Chickles et al. | |
| 7,047,255 B2 | 5/2006 | Iamichi et al. | |
| 7,058,654 B1 | 6/2006 | Burke | |
| 7,080,059 B1 | 7/2006 | Poston et al. | |
| 7,082,576 B2 * | 7/2006 | Shahine et al. | 715/789 |
| 7,162,470 B2 | 1/2007 | Sharma et al. | |
| 7,194,698 B2 | 3/2007 | Gottfurcht et al. | |
| 7,269,585 B1 | 9/2007 | Burke | |

(Continued)

OTHER PUBLICATIONS

Weekly SEO news: Sep. 6, 2011 6 pages.*

(Continued)

*Primary Examiner* — Andrea Long
(74) *Attorney, Agent, or Firm* — Fish & Richardson P.C.

(57) ABSTRACT

A method and system for providing user-navigable search results returns a resource representation for a resource, such as a web site or other Internet accessible object. The resource representation may be navigable by a user in a manner mirroring navigation of the resource. The resource representation may include a plurality of indicators representing menu links selected from resource links associated with the resource. Selection of an indicator may cause content associated with the indicator, such as resource links and related snippets, to be displayed. A hierarchical arrangement of elements in the resource representation may correspond to a hierarchical arrangement of navigable content in the resource.

19 Claims, 7 Drawing Sheets

(56) References Cited

U.S. PATENT DOCUMENTS

| | | |
|---|---|---|
| 7,353,109 B2 | 4/2008 | Han |
| 7,389,287 B1 | 6/2008 | Burke |
| 7,395,498 B2 | 7/2008 | Katayama et al. |
| 7,505,965 B2 | 3/2009 | Ivanov |
| 7,512,489 B2 | 3/2009 | Endo et al. |
| 7,529,743 B1 | 5/2009 | Ershov |
| 7,552,395 B2 | 6/2009 | Neale et al. |
| 7,580,945 B2 | 8/2009 | Liu |
| 7,599,917 B2 | 10/2009 | Meyerzon et al. |
| 7,603,616 B2 | 10/2009 | Obata et al. |
| 7,610,185 B1 | 10/2009 | Ershov |
| 7,627,598 B1 | 12/2009 | Burke |
| 7,660,822 B1 | 2/2010 | Pfleger |
| 7,668,822 B2 | 2/2010 | Kaul et al. |
| 7,668,827 B2 | 2/2010 | Gould et al. |
| 7,676,520 B2 | 3/2010 | Lui et al. |
| 7,680,777 B2 | 3/2010 | Poston et al. |
| 7,680,851 B2 | 3/2010 | Liu et al. |
| 7,698,267 B2 | 4/2010 | Papakonstantinou et al. |
| 7,716,198 B2 | 5/2010 | Meyerzon et al. |
| 7,739,277 B2 | 6/2010 | Meyerzon et al. |
| 7,756,987 B2 | 7/2010 | Wang et al. |
| 7,761,448 B2 | 7/2010 | Meyerzon et al. |
| 7,774,340 B2 | 8/2010 | Zhang et al. |
| 7,792,833 B2 | 9/2010 | Meyerzon et al. |
| 7,797,344 B2 | 9/2010 | Kaul et al. |
| 7,827,181 B2 | 11/2010 | Petriuc |
| 7,840,569 B2 | 11/2010 | Meyerzon et al. |
| 7,856,432 B2 | 12/2010 | Tesch et al. |
| 7,873,356 B2 | 1/2011 | Flynt et al. |
| 7,873,635 B2 | 1/2011 | Wang et al. |
| 7,877,385 B2 | 1/2011 | Craswell et al. |
| 7,885,952 B2 | 2/2011 | Chellapilla et al. |
| 7,930,303 B2 | 4/2011 | Liu et al. |
| 7,970,764 B1 | 6/2011 | Ershov |
| 8,005,784 B2 | 8/2011 | Liu et al. |
| 8,082,246 B2 | 12/2011 | Meyerzon et al. |
| 8,161,072 B1 | 4/2012 | Pfleger |
| 8,204,916 B2 | 6/2012 | Dawson et al. |
| 8,244,932 B2 | 8/2012 | Amini et al. |
| 8,261,196 B2 | 9/2012 | Oral et al. |
| 8,280,901 B2 | 10/2012 | McDonald |
| 8,326,924 B1 | 12/2012 | Lunenfeld |
| 8,346,815 B2 | 1/2013 | Dasher et al. |
| 8,356,046 B2 | 1/2013 | Hille-Doering et al. |
| 8,370,331 B2 | 2/2013 | Pontier et al. |
| 8,370,334 B2 | 2/2013 | Ferrenq et al. |
| 8,370,344 B2 | 2/2013 | Horibe et al. |
| 8,380,172 B1 | 2/2013 | Reeves et al. |
| 8,392,449 B2 | 3/2013 | Pelenur et al. |
| 8,423,611 B1 | 4/2013 | Lunenfeld |
| 8,428,865 B2 | 4/2013 | Otsuki |
| 8,438,180 B2 | 5/2013 | Poston et al. |
| 8,452,749 B2 | 5/2013 | Corella et al. |
| 8,452,806 B2 | 5/2013 | Gurnani et al. |
| 8,464,295 B2 | 6/2013 | Stallings et al. |
| 8,473,602 B2 | 6/2013 | Liu et al. |
| 2002/0080157 A1 | 6/2002 | Chickles et al. |
| 2003/0144996 A1 | 7/2003 | Moore, Jr. |
| 2003/0164827 A1 | 9/2003 | Gottesman et al. |
| 2003/0195877 A1* | 10/2003 | Ford et al. ............ 707/3 |
| 2003/0220916 A1 | 11/2003 | Imaichi et al. |
| 2004/0054691 A1 | 3/2004 | Sharma et al. |
| 2004/0117358 A1* | 6/2004 | von Kaenel et al. ............ 707/3 |
| 2004/0225437 A1 | 11/2004 | Endo et al. |
| 2005/0120005 A1 | 6/2005 | Tesch et al. |
| 2005/0177303 A1 | 8/2005 | Han |
| 2005/0192953 A1 | 9/2005 | Neale et al. |
| 2006/0036567 A1 | 2/2006 | Tan |
| 2006/0047424 A1 | 3/2006 | Ishikawa et al. |
| 2006/0047653 A1 | 3/2006 | Vaidyanthan et al. |
| 2006/0167851 A1 | 7/2006 | Ivanov |
| 2006/0218122 A1 | 9/2006 | Poston et al. |
| 2006/0287985 A1* | 12/2006 | Castro et al. ............ 707/3 |
| 2007/0067272 A1 | 3/2007 | Flynt et al. |
| 2007/0067305 A1 | 3/2007 | Ives |
| 2007/0067414 A1* | 3/2007 | Dayon ............ 709/217 |
| 2007/0192293 A1 | 8/2007 | Swen |
| 2007/0203903 A1 | 8/2007 | Attaran Rezaei et al. |
| 2007/0233654 A1 | 10/2007 | Karlson et al. |
| 2007/0276811 A1 | 11/2007 | Rosen |
| 2008/0082578 A1 | 4/2008 | Hogue et al. |
| 2008/0154863 A1 | 6/2008 | Goldstein |
| 2008/0155389 A1* | 6/2008 | Suh ............ 715/207 |
| 2008/0235205 A1 | 9/2008 | Fein et al. |
| 2009/0228471 A1 | 9/2009 | Dawson et al. |
| 2009/0228481 A1 | 9/2009 | Neale et al. |
| 2009/0241061 A1 | 9/2009 | Asai et al. |
| 2009/0276724 A1 | 11/2009 | Rosenthal |
| 2009/0299964 A1 | 12/2009 | Cameron et al. |
| 2009/0327240 A1 | 12/2009 | Meehan et al. |
| 2010/0036840 A1 | 2/2010 | Pitts |
| 2010/0106701 A1* | 4/2010 | Ducatel et al. ............ 707/706 |
| 2010/0198815 A1 | 8/2010 | Poston et al. |
| 2010/0241624 A1* | 9/2010 | Ramsey ............ G06F 17/30696 707/732 |
| 2010/0269062 A1* | 10/2010 | Kobylinski ............ 715/781 |
| 2010/0332325 A1* | 12/2010 | Holte ............ 705/14.54 |
| 2011/0167077 A1* | 7/2011 | Govani et al. ............ 707/767 |
| 2011/0196862 A1 | 8/2011 | Bergman et al. |
| 2011/0235107 A1* | 9/2011 | Sakata et al. ............ 358/1.15 |
| 2011/0276562 A1* | 11/2011 | Madden-Woods et al. ... 707/722 |
| 2011/0289067 A1 | 11/2011 | Jordan et al. |
| 2011/0295847 A1 | 12/2011 | Cucerzan et al. |
| 2012/0054687 A1 | 3/2012 | Kawabata |
| 2012/0059842 A1 | 3/2012 | Hille-Doering et al. |
| 2012/0066210 A1 | 3/2012 | Mukerjee et al. |
| 2012/0096344 A1* | 4/2012 | Ho et al. ............ 715/249 |
| 2012/0290566 A1 | 11/2012 | Dasher et al. |
| 2013/0006971 A1 | 1/2013 | Dasher et al. |
| 2013/0086506 A1* | 4/2013 | Molander et al. ............ 715/777 |
| 2013/0110803 A1 | 5/2013 | Mikalsen et al. |
| 2013/0117260 A1 | 5/2013 | Barrett et al. |
| 2013/0117310 A1 | 5/2013 | Chai et al. |
| 2013/0156347 A1 | 6/2013 | Dasher et al. |
| 2013/0166587 A1 | 6/2013 | Berry |

OTHER PUBLICATIONS

Bas Van Den Beld "Google Gave Us wo More Reasons for Getting Our Meta Description in Order" Aug. 23, 2011 6 pages.*

Blogging Quite Google improved its Sitelink Feature Aug. 16, 2011 3 pages.*

<Metataggs.org/> What is the meaning of the metatag "Description" Aug. 18, 2008 2 pages.*

Jon Ricerca Does the Number of Links on a Page Affect Ranking? Search Engine Optimization (SEO) Information http://web.olm1.com/search_engine_tips/24877.php Wayback Machine Archived dated Jul. 7, 2006.*

* cited by examiner

USER-NAVIGABLE RESOURCE REPRESENTATIONS

BACKGROUND

The present disclosure relates to representations of resources such as web sites identified in a search result.

Many computer users rely upon searching services for locating desired resources on a network. Searching services tend to generate search results comprised primarily of a flat list of resource links sorted according to a defined set of criteria.

SUMMARY

A method of generating representations of resources such as web sites and other network accessible objects is disclosed. Advantages provided by resource representations generated with the disclosed methods include conveying a hierarchical structure of a resource and enabling a navigable preview of the resource without requiring navigation to the resource itself. In one aspect, a disclosed method includes accessing data indicative of resource links associated with a resource, identifying menu links from the identified resource links, and identifying associations of the menu links with corresponding groups of the resource links. The method further includes generating a resource representation, which may include presentation content for display on a user device. The presentation content includes selectable menu indicators and display information. Menu indicators may be associated with corresponding menu links. The menu indicators may be implemented as selectable tabs and may include a currently selected menu indicator and the display information may include at least one of the resource links from the group of resource links associated with the currently selected menu indicator. The resource representation may include instructions executable to cause, in response to selection of a first menu indicator associated with a first menu link, a display of the presentation content to be updated to include at least some of the group of resource links associated with the first menu link.

The resource may be a web accessible object such as a web page, a video, an image, an audio file, or a combination thereof. The resource links may include all links or other navigable elements of a web site excluding any external links. The method may further include identifying significant resource links by identifying resource links satisfying significance criteria. The significance criteria may include a popularity criteria indicative of a link popularity. Identifying menu links may include identifying resource links that satisfy menu criteria. The menu criteria may include criteria pertaining to a resource's navigation hierarchy. The menu criteria may include, as an example, a depth criteria indicative of a link depth. The link depth of a resource such as a web page may indicate the number of resource links or the number of significant resource links included in or accessible from the resource. In some implementations, the significance of a link is a strong indicator of whether the link should be identified as a menu link and the menu criteria may include significance criteria. The menu criteria may include similarity criteria that might exclude, from consideration as menu links, links that otherwise satisfy significance criteria, depth criteria, and any other criteria pertaining to navigation hierarchy attributes of a link. Similarity criteria may include criteria pertaining to how closely the universal resource indicators of two links match.

The association between a menu link and its corresponding group of resource links may be based on, at least in part, a navigational hierarchy between the menu link and the group of resource links. The group of resource links might, as an example, represent resources that share a common navigational relationship with respect to the resource associated with the menu link. e.g., links corresponding to resources that are "child" resources of the menu link resource. The navigational relationship of links in a resource may be determined from domain object model (DOM) information contained within the resource itself. A resource such as a web site may include a site map or other form of information or data indicating a structural or architectural view of the web site. DOM information may have a structure or other characteristic that enables a web crawler or other external application to find the DOM and interpret the DOM information, e.g., determine a hierarchical structure of links in the resource from the DOM information. In some implementations, the association between a menu link and a corresponding group of resource links may be based upon or influenced by the screen location of the resource links within a resource. For example, a web page may include or be divided into sections and the links within a section may be related in some manner. In this example, a menu link may be associated with a group of resource links within a single section and the groups of resource links within that section may be determined by their location in the webpage. Similarly, if the resource is a site map or other type of webpage indicating aspects of the resource's DOM, an association may be made between a menu link and a group of resource links based on the locations of the resource links within the site map.

In another aspect, a disclosed data processing system includes one or more processors having access to computer readable media storing processor executable program instructions. The program instructions may include instructions executable to cause the one or more processors to access data indicative of resource links associated with a resource and to identify which of the resource links constitute menu links. The program instructions may include instructions executable to identify associations of menu links with corresponding groups of resource links and to generate a resource representation for the resource. The resource representation may include presentation content and the presentation content may include menu indicators and display information. A menu indicator may be associated with a corresponding menu link. The resource representation may include executable instructions to cause, in response to selection of a menu indicator associated with a corresponding menu link, a display of the presentation content to be updated to include some or all of the resource links associated with the corresponding menu link. Thus, the resource representation displayed or otherwise presented may change, in response to selection of a menu indicator, to present some or all of the resource links associated with a menu link corresponding to the currently selected menu indicator.

The number of menu indicators included in the presentation content may be determined based on a size of a display. A first of the menu indicators may be a Top Links indicator and the resource representation may cause, in response to selection of the Top Links indicator, a display of the presentation content to be updated to include resource links having a link significance exceeding a threshold value. The menu indicators may also be ordered according to a link significance of their associated menu links. The resource links included in the display information may be grouped in columns and each of the columns may have a link length criteria for the corresponding resource links. In some implementations, a last of the menu indicators may be a More indicator and the resource representation may cause, in response to selection of the More indicator, a display of the presentation content to be updated to include menu links exclusively.

In another aspect, a disclosed non-transitory computer readable media stores program instructions executable by a processor. The program instructions may include instructions that cause the processor to access data indicative of resource links associated with a resource and to identify menu links from the resource links. The program instructions include instructions to identify an association of a group of the resource links with a first menu link and to generate a resource representation for the resource. The resource representation may include presentation content that includes menu indicators and display information. The menu indicators may be associated with corresponding menu links. A display of the presentation content may, in response to selection of a menu indicator associated with the first menu link, be updated to include some or all of the resource links associated with the first menu link.

The resource links included in the display information may be grouped in columns and the columns may have a link length criteria for the corresponding resource links. The display information may include a snippet, e.g., a short text summary of or other non-navigable content pertaining to an applicable resource.

In another aspect, a disclosed method of providing a user-navigable interface representing a web site may include accessing data indicative of links and/or other navigable elements of the web site and identifying menu links comprising resource links that satisfy a menu criteria. The method may also include generating a user interface representation of the web site. The user interface may include a plurality of selectable menu indicators representing a corresponding plurality of the menu links, and a content window displaying content associated with a currently selected menu indicator. The content associated with the currently selected menu indicator may include a snippet, one or more of the resource links, or both.

In some implementations, the method may include providing or otherwise including instructions for a user interface representation of the web site within a search result that indicates the web site. The user interface may be navigable within the search result and may reflect a navigational hierarchy of the web site's resource links. The user interface may include a second indicator that does not directly correspond to a menu link from the web site.

In yet another aspect, a disclosed data processing system includes a processor and computer readable media, accessible to the processor, storing processor executable program instructions for generating a navigable representation of a web site. The program instructions may include instructions executable by the processor to detect a hierarchical configuration of the web site's resource links. The processor may generate a user interface presenting the navigable representation of the web site. The user interface may include a plurality of indicators, including a first indicator, respectively representing menu links of the web site. The user interface may further include content associated with each of the plurality of indicators. The content may be descriptive of a portion of the web site. The program instructions may also include instructions executable by the processor to display content associated with the first indicator when the first indicator is selected by a user.

In particular implementations, the content associated with the first indicator may include a link to the web site. The content associated with the first indicator may include links to pages of the web site that are subordinate to a web site page represented by the first indicator. The memory media may include instructions executable to present the user interface for display in a search result that includes a link to the web site as well as links to other web sites. The plurality of indicators may include a second indicator. When the second indicator is selected by a user, the executable instructions may cause content associated with the second indicator to be displayed. The memory media may include instructions executable to send the user interface to a web browser for display. The instructions executable to detect the hierarchical configuration of resource links of the web site may be performed in response to generating search results that include a link to the web site.

In still another aspect, non-transitory computer readable media store computer executable program instructions that, when executed by a processor, perform a method for generating a navigable representation of a web site. The processor executable method may detect menu links of the web site and generate a navigable user interface indicative of a navigational hierarchy of the web site. The user interface may include a plurality of indicators, including a first indicator, respectively representing menu links of the web site, and content associated with each of the plurality of indicators. The content may include a snippet. The program instructions may include instructions executable to display content associated with the first indicator when the first indicator is selected by a user. The user interface may be navigable by a user to preview a web site according to a navigational hierarchy of the web site.

In some implementations, the content associated with the first indicator may include a link to a web page or other resource of the web site. The content associated with the first indicator may indicate submenus of a web page or other resource of the web site represented by the first indicator. The memory media may include instructions executable to cause the user interface to be displayed within a search result that includes a link to the web site as well as links to other web sites. The first indicator may include a display element indicating when the first indicator is the currently selected indicator. A style or format of the user interface may match a style or format of the web site.

DETAILED DESCRIPTION

Figure 1:
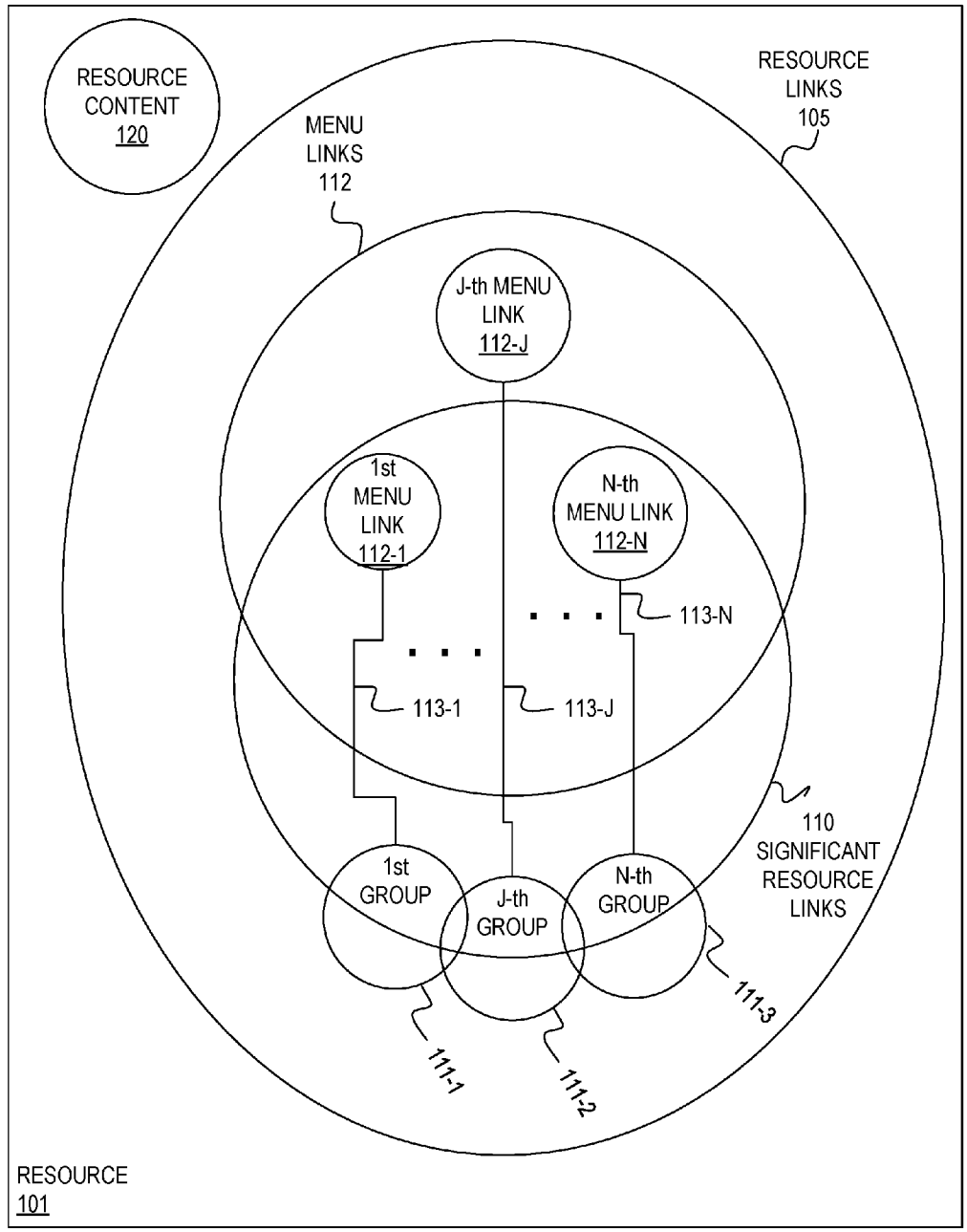
FIG. 1 illustrates selected elements of a resource.

In the following description, details are set forth by way of example to facilitate discussion of the disclosed subject matter. It should be apparent to a person of ordinary skill in the field, however, that the disclosed implementations are not exhaustive of all possible implementations.

Throughout this disclosure, the hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Referring now to FIG. 1, a resource 101 is represented in Venn diagram format to illustrate selected elements of the resource and relationships between the selected elements that influence the resource representation described herein. Resource 101 may represent any of a variety of Internet accessible objects including a web page or a set of related web pages, e.g., a web site, a video, an image, an audio file, or a combination thereof. FIG. 1 depicts resource 101 as including resource content 120 and resource links 105. Resource content 120 represents text and other non-navigable elements of resource 101. For example, for a resource 101 such as a web site of a community college, resource content 120 may include text and images pertaining to the college, the faculty, and courses offered as well as any other text, images, or other non-navigable information located on the community college's web site.

Resource 101 as depicted in FIG. 1 includes, in addition to resource content 120, resource links 105. Resource links 105 represents links (i.e., hyperlinks and other navigable elements) of resource 101 and encompasses significant resource links 110, menu links 112, and other links located within the navigation hierarchy of resource 101. For purposes of generating resource representations as disclosed herein, in some implementations, resource links 105 excludes external links in resource 101, e.g., links that navigate to a different top level domain than the top level domain of resource 101. For a resource 101 such as a web site of a community college, resource links 105 may, for example, represent hyperlinks to information pertaining to the faculty, courses offered, school calendar, admission applications, news, contacts, and other content located on web pages of the community college's web site as well as other navigable elements located within the navigational hierarchy of the community college's web site.

Significant resource links 110 represents a subset of resource links 105 that satisfy significance criteria. For example, a resource link 105 may be associated with a score or other type of valuation of the link's significance. A link's significance might be based on various factors, including how frequently the link is accessed (click history). Significant resource links 110 of resource 101 represents those resource links 105 of resource 101 having a score exceeding a specified threshold. Identifying significant resource links 110 of resource 101 may involve applying a significance criteria to a plurality of resource links 105. For example, significant resource links 110 for a community college web site resource 101 may represent links to resources of the web site that are frequently accessed such as web pages that describe popular courses offered by the community college, web pages that include contact information for departments within the college, and images of maps of the college.

Menu links 112 represents those resource links 105 that satisfy menu criteria for the corresponding resource 101. The menu criteria may include criteria pertaining to the resource's navigation hierarchy. The menu criteria may include, as an example, a depth criteria indicative of a link depth. The link depth of a community college web site resource 101 may indicate the number of resource links or the number of significant resource links included in or accessible from the community college's web site. As depicted in FIG. 1, some, but not all, menu links 112 are significant resource links 110.

In some implementations, however, the significance of a link is a strong indicator of whether the link should be identified as a menu link and the menu criteria may include significance criteria. The menu criteria may include similarity criteria that might exclude, from consideration as menu links, links that otherwise satisfy significance criteria, depth criteria, and any other criteria pertaining to navigation hierarchy attributes of a link. Similarity criteria may include criteria pertaining to how closely the universal resource indicators of two links match. Menu links 112 for a community college web site resource 101 may represent links to types of courses offered by the college, news pertaining to the college, commencement activities, and the like.

FIG. 1 further depicts resource link groups 111 and associations 113 between menu links 112 and corresponding resource link groups 111. The association 113 between a menu link 112 and its corresponding resource link group 111 may be based on, at least in part, a navigational hierarchy between the menu link and the resource link group. The resource link group 111 might, as an example, represent resources that share a common navigational relationship with respect to the resource associated with the menu link, e.g., links corresponding to resources that are "child resources" of the menu link resource. The navigational relationship of links in a resource may be determined from DOM information contained within the resource itself. A resource such as a web site may include a site map or other form of information or data indicating a structural or architectural view of the web site. DOM information may have a structure or other characteristic that enables a web crawler or other external application to find the DOM and interpret the DOM information, e.g., determine a hierarchical structure of links in the resource from the DOM information. In some implementations, the association between a menu link 112 and a corresponding resource link group 111 may be based upon or influenced by the screen location of the resource links within a resource. For example, a web page may include or be divided into sections and the links within a section may be related in some manner. In this example, a menu link may be associated with a group of resource links within a single section and the groups of resource links within that section may be determined by their location in the webpage. Similarly, if the resource is a site map or other type of webpage indicating aspects of the resource's DOM, an association may be made between a menu link 112 and a resource group 111 based on the locations of the resource links within the site map.

As suggested above, associations 113 may be based on or otherwise reflect a navigation hierarchy of resource 101, a navigational relationship between a menu link 112 and the resource links in the corresponding resource link group 111, or both. Associations 113 may, for example, represent or reflect menu criteria, excluding any significance criteria previously referred to. As depicted in FIG. 1, menu links 112-1 and 112-N are included within significant resource links 110, i.e., menu links 112-1 and 112-N have a significant score exceeding a specified threshold or otherwise satisfy significance criteria, while menu link 112-J is included within resource links 105, but is not included within significant resource links 110. This depiction is consistent with implementations in which a link's significance is an indicator, and perhaps even a strong indicator, for menu link status, but is not strictly required. Similarly, FIG. 1 illustrates that the group of resource links 111 associated with any given menu link 112 may include significant resource links 110 as well as non-significant resource links, i.e., resource links 105 not included within significant resource links 110. As was stated with respect to menu link status, the significance of a resource link may influence whether the resource link is included within a resource link group 111 associated with a menu link 112. FIG. 1 still further conveys that resource link groups 111 are not mutually exclusive, i.e., a resource link 105, whether qualifying as a significant resource link 110 or not, may be included within more than one resource link group 111, and thus, may be associated with more than one of menu links 112. Methods described below with respect to FIG. 2 and FIG. 3 include methods for generating and displaying a representation of resource 101 reflecting the association 113 between menu links 112 and resource link groups 111 depicted in FIG. 1 such that a hierarchical structure of a resource is conveyed and a navigable preview of the resource without requiring navigation to the resource itself is enabled.

Figure 2:
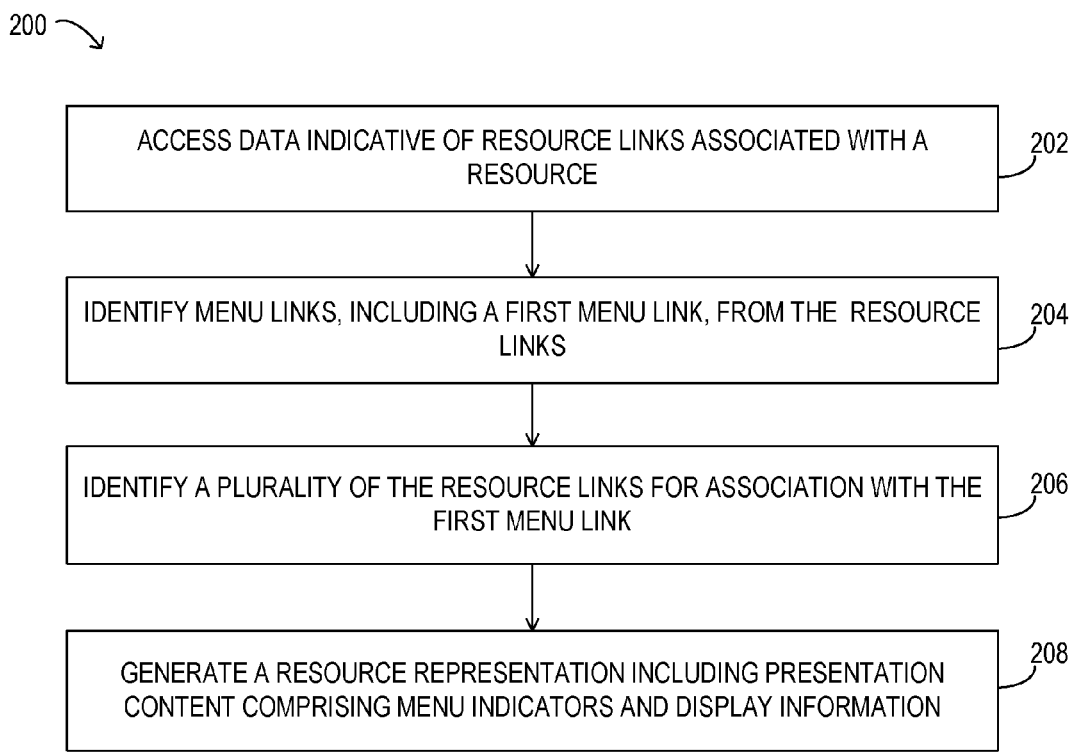
FIG. 2 illustrates selected elements of an implementation of a method for generating a resource representation.

Turning now to FIG. 2, selected elements of an implementation of method 200 for generating a resource representation are illustrated. In some implementations, method 200 may be performed by data processing system 700 (see FIG. 7). It is noted that certain operations described in method 200 may be optional or may be rearranged. It is further noted that some operations in method 200 may be performed independent of other operations and may be performed at different times and by different systems.

The depicted implementation of method 200 includes accessing (operation 202) data indicative of resource links associated with a resource and identifying (operation 204) menu links, including a first menu link, from the resource links. A group of the resource links for association with the first menu link is identified (operation 206). Identification of the resource links accessed in operation 202 may be performed periodically by a web crawler or other suitable application apart from the operations included in method 200 and data indicative of resource links, including scoring or significance information, may be stored in a database (not depicted) for access in accordance with operation 202. The identification of menu links, including a first menu link, from the resource links (operation 204) and identification of a group of resource links from the resource links for association with the first menu link (operation 206) may be accomplished as suggested above in the description of FIG. 1. Namely, as suggested previously, resource links may be associated with significance scores or valuations that may be based on click history or other criteria indicative of a link's significance or popularity. Similarly, information regarding the navigational hierarchy of the applicable resource, including link depth and/or other hierarchy parameters corresponding to the resource links for the resource, may then be accessed for the resource links to identify menu links for inclusion within the resource representation. A plurality of the resource links for the resource may then be identified for association with each of the identified menu links.

Method 200 as depicted in FIG. 2 further includes generating (operation 208) a resource representation for the resource where the resource representation includes presentation content. The presentation content may include menu indicators and display information. The display information may include actual content in the resource. The resource representation may further include instructions, e.g., Java script or other instructions executable by a browser operating on a user device, to generate a user interface that may include a variety of types of selectable objects that a user of the web site might interact with, such as menus, lists, rollover or dynamic menus, etc., corresponding to each menu indicator. In one implementation, for example, the user interface employs horizontally arranged tabs corresponding to each menu indicator. In this implementation, clicking or otherwise selecting a tab, or other selectable object, reveals a snippet from a corresponding menu link, such as a universal resource locator (URL) associated with the selected menu indicator, and depicts other resource links accessible from the URL.

Figure 3:
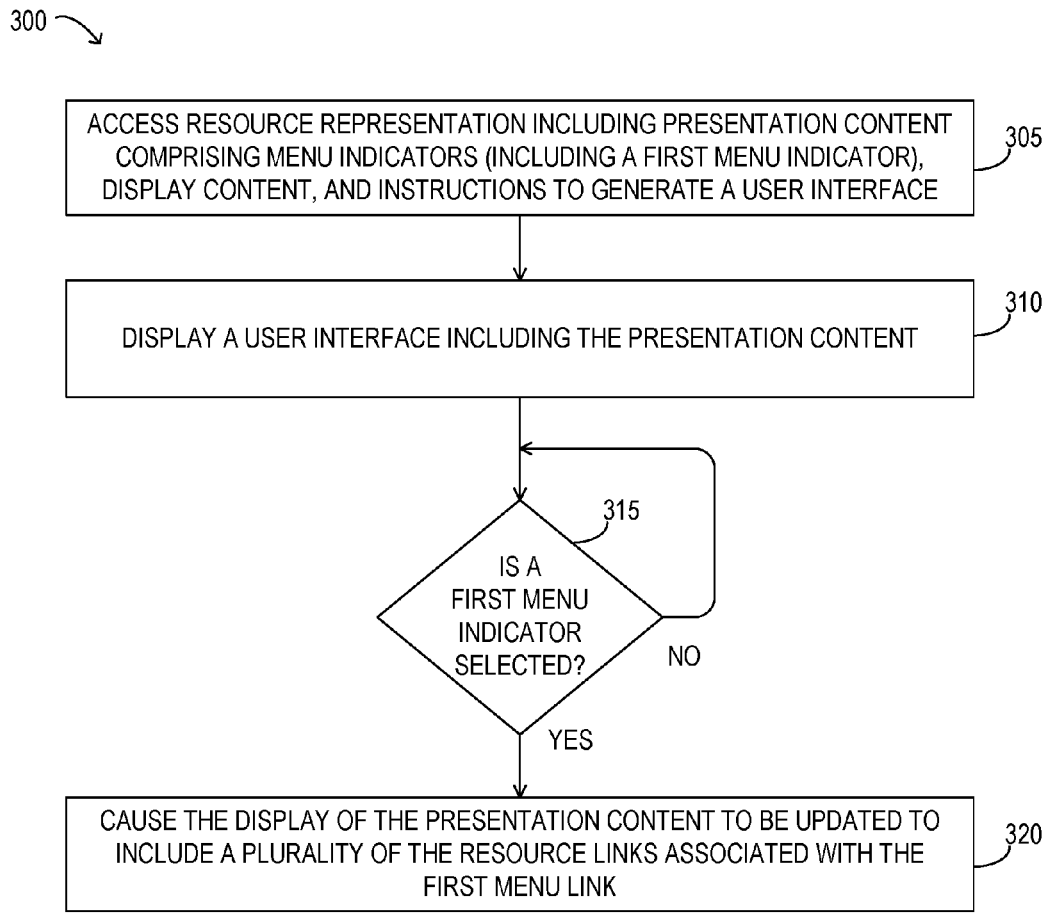
FIG. 3 illustrates selected elements of an implementation of a method for displaying a resource representation.

Referring now to FIG. 3, selected elements of an implementation of method 300 for displaying a resource representation are illustrated. In some implementations, method 300 may be performed by data processing system 700 (see FIG. 7). It is noted that certain operations described in method 300 may be optional or may be rearranged.

The depicted implementation of method 300 includes accessing a resource representation (operation 305) generated in accordance with method 200. The instructions to generate a user interface that are included in the resource representation cause a processor to display (operation 310) the presentation content included in the resource representation to an end user. Method 300 as shown further includes determining (operation 315) whether a first menu indicator is selected. The first menu indicator may represent the first menu link and may be one of a plurality of menu indicators respectively representing menu links. When the result of operation 315 is NO, method 300 loops back to operation 310, representing a wait state for user interaction. When the result of operation 315 is YES, method 300 includes causing (operation 320) a display of the presentation content to be updated to include the plurality of the resource links that were associated with the first menu link in operation 206 of method 200. In some implementations (not shown) of method 300, operations 315 and 320 represent executable instructions that may be generated instead of actually performing operations 315 and 320.

Figure 4:
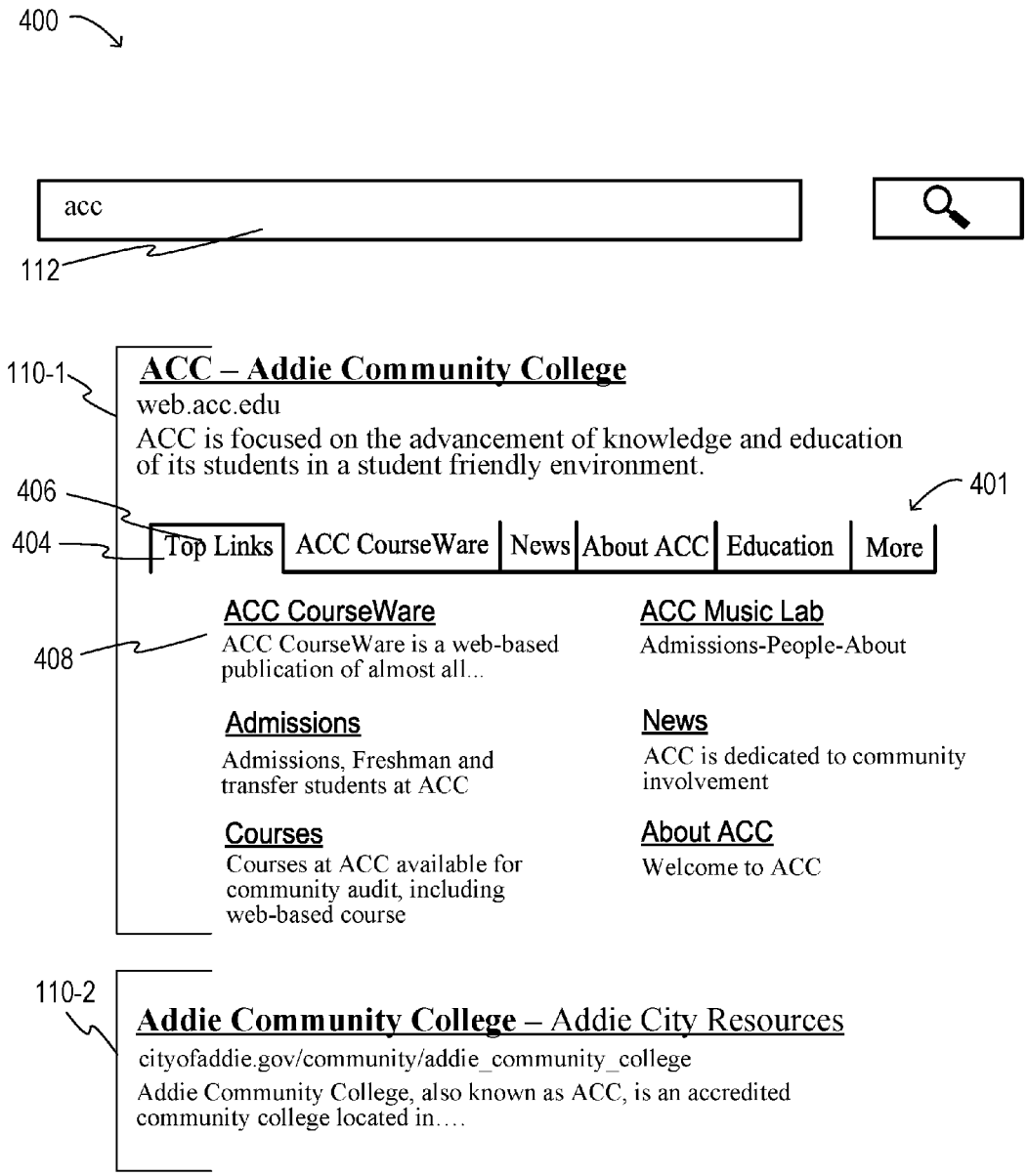
FIG. 4 illustrates selected elements of an implementation of a search result identifying a resource and including a user-navigable representation of the resource, depicted with one of its menu indicators selected.
Figure 5:
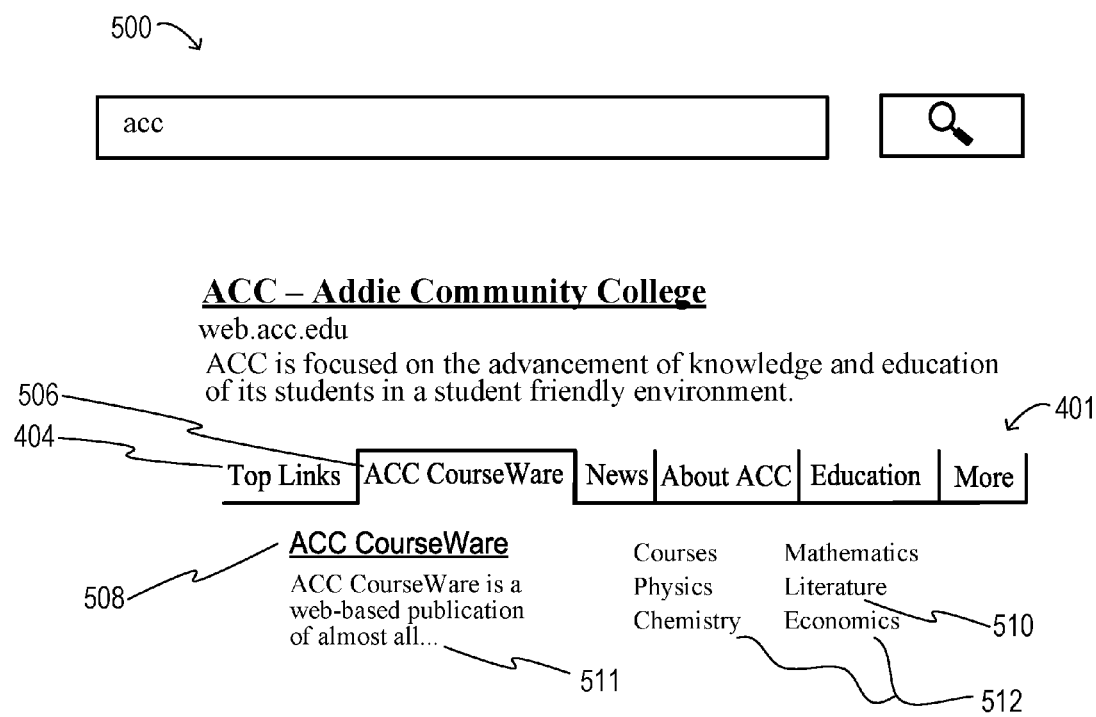
FIG. 5 illustrates the user-navigable resource representation of FIG. 4, depicted with another menu indicator selected.
Figure 6:
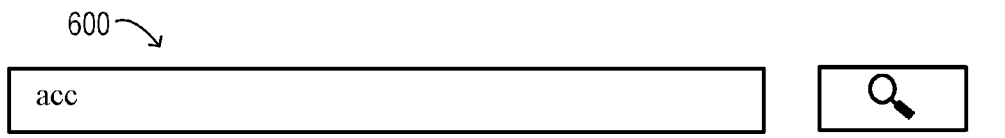
FIG. 6 illustrates the user-navigable resource representation of FIG. 4, depicted with still another menu indicator selected.
Figure 6:
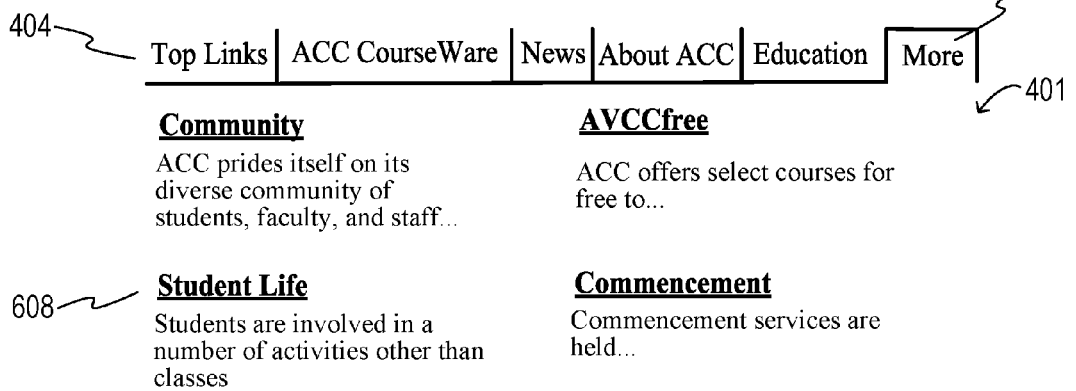

FIG. 4 to FIG. 6 illustrate a representative implementation of generating and displaying a representation of a resource indicated in a search result. In the depicted implementation, the resource is a web site listed or otherwise indicated in a search result. A resource representation generated and displayed in accordance with methods 200 and 300 reveals a navigational hierarchy or other organizational characteristics of the web site. In other implementations, and as noted previously, the resource may be any web accessible object such as a video, an image, an audio file, or a combination thereof. As previously suggested, the resource representation may include instructions to generate a navigable user interface that enables the user to preview the web site, i.e., navigate the user interface to explore content of the web site without navigating to the web site or otherwise navigating away from the search result.

Turning now to FIG. 4, selected elements of an implementation of user-navigable search window 400 are illustrated. User-navigable search window 400 is generated by a client browser upon receiving a reply to a search query using search term 112. Search window 400 includes a first search result 110-1 and a second search result 110-2. First search result 110-1 indicates a resource. In certain implementations, a search engine may generate search result information from which a client browser generates content displayed in user-navigable search window 400. First search result 110-1 includes a user interface referred to herein as resource representation 401. Resource representation 401 includes a navigable user interface enabling a user to preview the applicable resource, that is, without having to navigate to the resource itself or otherwise navigate away from search window 400.

Resource representation 401 as depicted in FIG. 4 includes menu indicators 404 and display information 408. These elements may convey a hierarchical arrangement of the resource associated with first search result 110-1. In certain implementations, the hierarchical arrangement of the web site may reflect an organizational structure of an entity hosting the web site.

In the example shown in FIG. 4, resource representation 401 includes menu indicators 404 and display information 408. Display information 408 includes resource links, such as URL hyperlinks corresponding to portions of the web site, as well as snippets. Although menu indicators 404 are shown as selectable tabs, it is noted that other structures providing menu indicators and corresponding content displays may be used in other implementations. When a menu indicator 404 is selected, a respective panel of display information 408 appears and the selected menu indicator 404 is visually indicated as the currently selected indicator 406. As shown in FIG. 4, the menu indicator 404 labeled "Top Links" is indicated as the currently selected indicator 406. Other menu indicators 404 shown include "ACC CourseWare", "News", "About ACC", "Education", and "More", for which no corresponding display content is shown.

Menu indicators 404 correspond to menu links. In certain implementations, menu indicators 404 may be ordered according to a link popularity of the associated menu links. In certain instances, menu indicators 404 may include resource links that do not satisfy the depth criteria. For example, the Top Links menu indicator may represent a significance criteria for all navigable items in the resource, such that display information 408 corresponding to the Top Links menu indicator includes a plurality of significant resource links having a link popularity exceeding a threshold value or the M most popular significant resource links where M is limited by the amount of display screen space available for display information 408.

Thus, in one implementation, menu indicators 404 represent a resource's navigable menu items. Display information 408 associated with a menu indicator 404 may include a submenu that includes a subset of the significant resource links associated with menu indicator 404 and/or a snippet or other content associated with the menu item. In this manner, a user may preview the represented resource by navigating resource representation 401. Although not shown for descriptive clarity, it is noted that display information 408 may include further hierarchical elements, such as further tabbed structures, to depict multiple levels of resource hierarchy in resource representation 401.

It is noted that certain menu indicators 404 may include additional display elements (not shown) to convey information describing what type of display information 408 appears in a respectively associated content panel. For example, when a menu indicator 404 represents a menu item having subordinate submenus and additional navigational options, a corresponding display element (not shown) may appear in currently selected indicator 406. Thus, menu indicator 404 may include a display element indicating when a link to a submenu is present in the corresponding display information 408. Resource representation 401 may also include dynamic content (not shown) that may appear in response to user actions or navigational input. In one such implementation, additional display content (not shown) may appear when the user indicates interest by hovering a cursor over certain elements. Other logical methods may be employed to provide transitions between portions of resource representation 401, such as automatic closure of currently selected indicator 406 when a corresponding user intent has been ascertained. Furthermore, a style or formatting element in resource representation 401 may match an aspect of the web site or other resource represented. For example, a display style (e.g., color scheme, font selection, imagery, etc.) of resource representation 401 may mirror or otherwise convey a display style of the resource.

Turning now to FIG. 5, selected elements of an implementation of user-navigable search window 500 are illustrated. User-navigable search window 500 is substantially similar to user-navigable search window 400 presented in FIG. 4, showing a presentation when the currently selected menu indicator 404, represented by currently selected indicator 506, is the ACC CourseWare menu indicator and display information 508 corresponds to currently selected indicator 506. Display information 508 as shown includes links 510 to portions of the resource that may represent elements that are hierarchically subordinate to the menu item represented by currently selected indicator 506. Display information 508 also includes a snippet 511.

Various other features of resource representation 401 may be implemented. For example, the number of menu indicators 404 included in resource representation 401 may be determined based on a desired width of resource representation 401 subject to constraints imposed by the size of a display device. In certain implementations, the number of menu indicators 404 included with resource representation 401 may be determined based on a size of user-navigable search window 500 and/or a size of a display, such as a display on which user-navigable search window 500 is presented. As shown, display information 508 includes additional resource links 510 that are grouped in columns 512. The columns 512 may be selected based on a link length criteria indicating, for example, a label text length, for presenting additional resource links 510 in a neat and user friendly manner.

Turning now to FIG. 6, selected elements of an implementation of a user-navigable search window 600 are illustrated. User-navigable search window 600 is substantially similar to user-navigable search results 400 presented in FIG. 4, showing a presentation when the currently selected menu indicator represented by currently selected indicator 606 is the More menu indicator and display information 608 corresponds to the More menu indicator. As shown in FIG. 6, the More menu indicator is associated with display information 608 that includes menu links that could not be presented as distinct menu indicators 404 due to the constraints on the size of resource representation 401.

Figure 7:
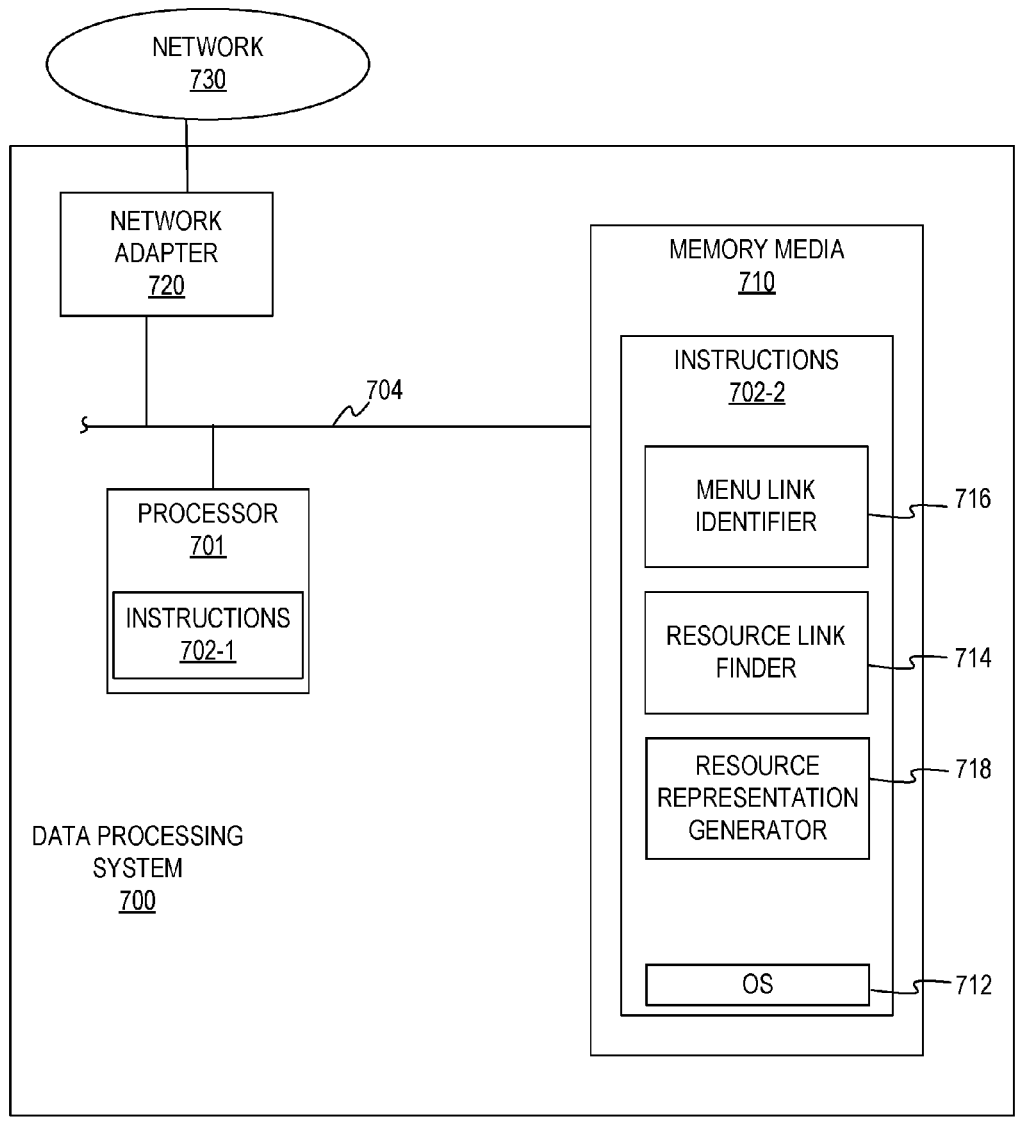
FIG. 7 is a block diagram of selected elements of an implementation of a data processing system.

Referring now to FIG. 7, a block diagram illustrating selected elements of an implementation of data processing system 700 is presented. Data processing system 700 may represent either a server providing search results or a client processing search results. In some implementations, some of the elements depicted in FIG. 7 may be implemented in a server and other elements may be implemented in a client. Data processing system 700 may be implemented as any of a variety of computing devices including servers, desktop computers, laptop computers, tablets, and mobile devices including smart phones, etc.

In the implementation depicted in FIG. 7, data processing system 700 includes processor 701 coupled via bus 704 to storage media collectively identified as memory media 710. Data processing system 700, as depicted in FIG. 7, further includes network adapter 720 that interfaces data processing system 700 to a network 730.

In FIG. 7, memory media 710 encompasses persistent and volatile media, fixed and removable media, and magnetic, semiconductor, and optical media. Memory media 710 is operable to store instructions, data, or both. Memory media 710 as shown includes sets or sequences of instructions 702-2 including an operating system 712, resource link finder 714, menu link identifier 716, and resource representation generator 718. Operating system 712 may be an Android, IOS, UNIX or UNIX-like, Windows® family, Mac OS, or another suitable operating system. Instructions 702 may also reside, completely or at least partially, within processor 701 during execution thereof. It is further noted that processor 701 may be configured to receive instructions 702-1 from memory media 710 via shared bus 704. Resource link finder 714 may represent a routine for accessing data indicative of resource links (see, e.g., operation 202, FIG. 2). Menu link identifier 716 may represent a routine for identifying which resource links constitute menu links (see, e.g., operation 204, FIG. 2) and identifying an association of groups of resource links with the corresponding menu link (see, e.g., operation 206, FIG. 2). Resource representation generator 718 may represent a routine that generates a resource representation (see, e.g., resource representation 401, FIGS. 4-6) suitable for display on a display device.

In some implementations, resource link finder 714, menu link identifier 716, and resource representation generator 718 are implemented on a server system. In these implementations, data generated by resource representation generator 718 includes, in addition to data indicative of content to be displayed, instructions, suitable for execution by a browser of a client system, for generating some or all of the resource representation.

To the maximum extent allowed by law, the scope of the present disclosure is to be determined by the broadest permissible interpretation of the following claims and their equivalents, and shall not be restricted or limited to the specific implementations described in the foregoing detailed description.

What is claimed is:

1. A method comprising:
  accessing data indicative of resource links in a resource;
  identifying, by a data processing system, menu links from the resource links in the resource based on whether a number of resource links in another resource linked to by each of the resource links satisfies a depth criteria, wherein the menu links include at least a first menu link and a second menu link;
  in response to identifying menu links from the resource links in the resource based on whether the number of resource links in the other resource linked to by each of the resource links satisfies the depth criteria, identifying, by the data processing system, an association of a first plurality of the resource links in the resource with the first menu link identified from the resource links in the resource and an association of a second plurality of the resource links in the resource with the second menu link identified from the resource links in the resource;
  receiving a query;
  determining that the resource is responsive to the query; and
  in response to determining that the resource is responsive to the query, providing search results that are responsive to the query, the search results comprising a resource representation for the resource generated based on the association of the first plurality of the resource links in the resource with the first menu link identified from the resource links in the resource and the association of the second plurality of the resource links in the resource with the second menu link identified from the resource links in the resource, the resource representation comprising:
    presentation content for display on a user device, the presentation content comprising:
      two or more menu indicators, wherein a first menu indicator is associated with the first menu link and the second menu indicator is associated with the second menu link;
    display information, wherein the display information includes at least one of the resource links; and
    instructions executable by a processor to cause, in response to selection of the second menu indicator associated with the second menu link, a display of the presentation content to be updated within the search results to include at least some of the plurality of the resource links associated with the second menu link.

2. The method of claim 1, wherein the resource comprises a web accessible object.

3. The method of claim 2, wherein the web accessible object comprises an object selected from:
  a web page, a video, an image, an audio file, and a combination thereof.

4. The method of claim 1, wherein accessing data indicative of resource links comprises identifying significant resource links satisfying significance criteria and wherein the significance criteria include criteria indicative of a link popularity.

5. The method of claim 1, wherein the identifying the association reflects identifying a navigational hierarchy between the first menu link and the plurality of resource links.

6. The method of claim 1, wherein the menu indicators include selectable tabs.

7. A data processing system, comprising:
  one or more processors; and
  computer readable media accessible to the one or more processors, storing processor executable program instructions, the program instructions including instructions executable to cause the one or more processors to:
    access data indicative of resource links in a resource;
    identify menu links from the resource links in the resource based on whether a number of resource links in another resource linked to by each of the resource links satisfies a depth criteria, wherein the menu links include at least a first menu link and a second menu link;
    in response to identifying menu links from the resource links in the resource based on whether the number of resource links in the other resource linked to by each of the resource links satisfies the depth criteria, identify an association of a first plurality of the resource links in the resource with the first menu link identified from the resource links in the resource and an association of a second plurality of the resource links in the resource with the second menu link identified from the resource links in the resource;
    receive a query;
    determine that the resource is responsive to the query; and
    in response to determining that the resource is responsive to the query, provide search results that are responsive to the query, the search results comprising a resource representation for the resource generated based on the association of the first plurality of the resource links in the resource with the first menu link identified from the resource links in the resource and the association of the second plurality of the resource links in the resource with the second menu link identified from the resource links in the resource, the resource representation comprising:
      presentation content for display on a user device, the presentation content comprising:

two or more menu indicators, wherein a first menu indicator is associated with the first menu link and a second menu indicator is associated with the second menu link; and display information, wherein the display information includes at least one of the resource links, wherein a display of the presentation content, in response to selection of the second menu indicator associated with the second menu link, is updated within the search results to include at least some of the plurality of the resource links associated with the second menu link.

8. The data processing system of claim 7, wherein the resource comprises a web accessible object.

9. The data processing system of claim 8, wherein the web accessible object comprises an object selected from:
a web page, a video, an image, an audio file, and a combination thereof.

10. The data processing system of claim 7, wherein a number of menu indicators included in the presentation content is determined based on a size of a display.

11. The data processing system of claim 7, wherein the resource representation is configured to cause, in response to selection of a first indicator, a display of the presentation content to include a plurality of significant resource links comprising resource links having a link popularity exceeding a threshold value.

12. The data processing system of claim 7, wherein the menu indicators are ordered according to a link popularity of the associated menu links.

13. The data processing system of claim 7, wherein the resource links included in the display information are grouped in columns and wherein each of the columns has a length criteria for the corresponding resource links.

14. A non-transitory computer readable media storing computer executable program instructions, the program instructions including instructions executable to cause a processor to:

access data indicative of resource links in a resource;

identify menu links from the resource links in the resource based on whether a number of resource links in another resource linked to by each of the resource links satisfies a depth criteria, wherein the menu links include at least a first menu link and a second menu link;

in response to identifying menu links from the resource links in the resource based on whether the number of resource links in the other resource linked to by each of the resource links satisfies the depth criteria, identify an association of a first plurality of the resource links in the resource with the first menu link identified from the resource links in the resource and an association of a second plurality of the resource links in the resource with the second menu link identified from the resource links in the resource;

receive a query;

determine that the resource is responsive to the query; and in response to determining that the resource is responsive to the query, provide search results that are responsive to the query, the search results comprising a resource representation for the resource generated based on the association of the first plurality of the resource links in the resource with the first menu link identified from the resource links in the resource and the association of the second plurality of the resource links in the resource with the second menu link identified from the resource links in the resource, the resource representation comprising:

presentation content for display on a user device, the presentation content comprising:

two or more menu indicators, wherein a first menu indicator is associated with the first menu link and a second menu indicator is associated with the second menu link; and display information, wherein the display information includes at least one of the resource links, wherein a display of the presentation content, in response to selection of the second menu indicator associated with the second menu link, is updated within the search results to include at least some of the plurality of the resource links associated with the second menu link.

15. The computer readable media of claim 14, wherein the resource comprises a web accessible object.

16. The computer readable media of claim 15, wherein the web accessible object comprises an object selected from:
a web page, a video, an image, an audio file, and a combination thereof.

17. The computer readable media of claim 14, wherein the resource representation is configured to cause, in response to selection of a last indicator, a display of the presentation content to be updated to include menu links exclusively.

18. The computer readable media of claim 14, wherein the resource links included in the display information are grouped in columns and wherein each of the columns has a length criteria for the corresponding resource links.

19. The computer readable media of claim 14, wherein the display information includes a snippet describing the first menu link.

* * * * *